Dec. 27, 1966    Z. TARCZY-HORNOCH    3,295,047
HIGH VOLTAGE POWER SUPPLY
Filed June 20, 1963

INVENTOR.
Zoltan Tarczy-Hornoch
BY
*Flehr and Swain*
Attorneys 3,295,047
HIGH VOLTAGE POWER SUPPLY
Zoltan Tarczy-Hornoch, Berkeley, Calif., assignor to
W. K. Rosenberry, Berkeley, Calif.
Filed June 20, 1963, Ser. No. 289,263
3 Claims. (Cl. 321—15)

This invention relates to a high voltage power supply and more particularly to a high voltage power supply stabilized against input voltage variations.

High voltage power supplies have been provided in the past. One approach has been to stabilize the input line voltage by stabilizing transformers and then utilizing conventional unstabilized high voltage power supply circuits. Another practice has been to multiply or directly rectify the voltage to the high voltage desired and then to regulate the D.C. output electronically with series or parallel regulating circuits. For regulation, a series of Zener diodes with constant current drain with a total voltage drop equaling the power supply voltage have been used frequently. However, all of these approaches are relatively expensive. There is therefore a need for a new and improved high voltage power supply which can be manufactured very economically.

In general, it is an object of the present invention to provide a high voltage power supply which can be produced very inexpensively.

Another object of the invention is to provide a high voltage power supply of the above character which does not require a multiplicity of Zener diodes in the output.

Another object of the invention is to provide a high voltage power supply of the above character in which there is very little current drain under standby conditions.

Another object of the invention is to provide a high voltage power supply of the above character in which various combinations of output voltages can be obtained.

Another object of the invention is to provide a high voltage power supply of the above character in which one or more Zener diodes are utilized in the voltage multiplying circuitry.

Additional features of the invention will appear from the following description in which the preferred embodiments are set forth in detail in conjunction with the accompanying drawings.

Referring to the drawings.

In general, my high voltage power supply consists of a source of alternating current electrical power and relatively low voltage regulating means in the form of one or more Zener diodes and one or more resistance elements connected across the output of the low voltage power supply. A multiplying circuitry is connected to the output from the voltage regulating circuitry.

Figure 1:
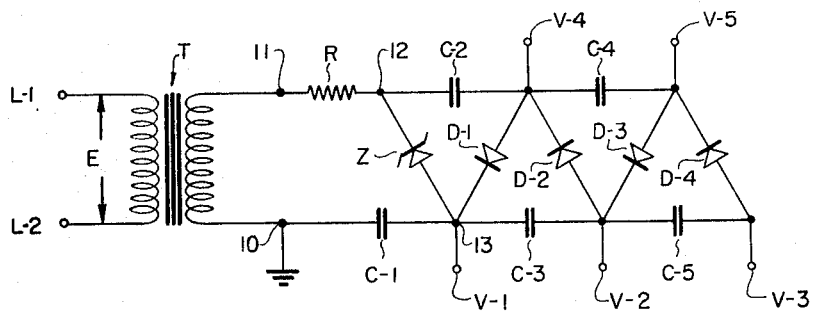
FIGURE 1 is a circuit diagram of a high voltage power supply incorporating my invention.

More in particular, circuitry showing my high voltage power supply is shown in FIGURE 1. The source of low voltage electrical power is indicated by $E_{in}$ connected across the terminals L1 and L2 of a transformer T. The low voltage power supply can be of any suitable type such as 110 volt 60 cycle A.C. The transformer T can be of a very inexpensive type such as a transformer which has an output of approximately 250 volts with an input of 110 volts. Alternatively, if the desired voltage is available, it can be omitted.

Voltage regulating circuitry is connected in the output of the transformer T and is shown connected across the output terminals 10 and 11 of the transformer. This voltage regulating circuitry consists of at least one Zener diode Z which has one side connected to one side of the output of the transformer T by at least one series resistor indicated by R. Under certain conditions the resistance represented by the resistor R can be the internal impedance of the low voltage supply or the transformer. The other side of the Zener diode Z is connected to the other side of the output transformer T through a capacitor C1. The output terminal 10 of the transformer T is grounded as shown.

The output of the voltage regulating circuitry appears across the terminals 12 and 13. Voltage multiplying circuitry is connected to these output terminals and consists of a series of diodes D1, D2, D3, and D4 which are connected in series to one side 13 of the voltage regulating circuitry. A capacitor C2 is connected between the other side of the diode D1 and the other side 12 of the output from the voltage regulating circuitry. A capacitor C3 is connected between one side of the diode D2 and the first side of the diode D1. The capacitors C4 and C5 are connected in a similar manner between their associated diodes.

The junctions between the Zener diode and the diode D1, D2, D3 and D4 have been connected to output terminals identified as V1, V2, V3, V4 and V5.

Operation of the high voltage power supply may be briefly described as follows. When alternating current is applied to the transformer T and the secondary goes through its negative cycle the Zener diode Z conducts and capacitor C1 is charged. When the secondary goes positive the Zener diode does not conduct but diode D1 does so that C1 shares its charge with C2, etc. The Zener diode Z serves two functions. It serves as a diode in one direction of current flow and as a voltage limiter in the other direction of current flow. In other words, it serves as a rectifier in one direction and as a clipper in the opposite direction. The Zener diode is connected so that in the direction of reverse breakdown of the Zener diode it serves as a clipper or voltage limiter. In operating in this manner it converts a sine wave voltage to a square wave voltage. Thus it can be seen that the output from the voltage regulating circuitry which appears at the output terminal 13 is a voltage which is first rectified by the Zener diode, then stabilized by the Zener diode and filtered by the capacitor C1. The series resistor R serves as a current limiting resistor and as a working impedance for the Zener diode. Thus the regulated amplitude square wave which is the output from the voltage regulating circuitry at terminals 12 and 13 supplied to a plurality of serially connected diodes D1, D2, D3 and D4 to multiply the voltage in a conventional manner to the desired level with the necessary capacitors C2, C3, C4 and C5. With the terminal 10 grounded as shown, voltages V1, V2 and V3 can be obtained. Alternatively if the terminal 12 is grounded voltages V4 and V5 can be obtained. The power supply described provides negative output potential. For positive output the polarity of the diodes and the Zener diodes should be inverted.

Figure 1A:
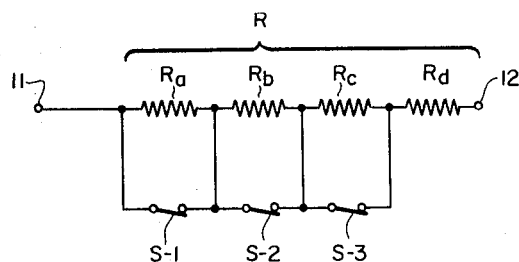
FIGURE 1A is a section of circuitry which can be incorporated in the circuitry as shown in FIGURE 1 to take the place of the resistor R.
Figure 1B:
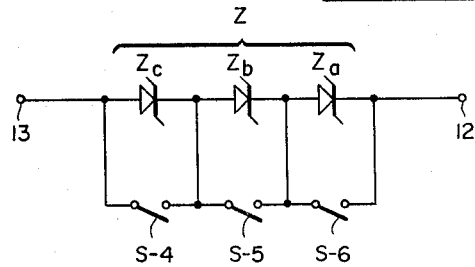
FIGURE 1B is a section of circuitry which can be substituted for the Zener diode Z shown in FIGURE 1.

If it is desired to obtain additional lower voltage arrangements such as those shown in FIGURES 1A and 1B can be provided. For example, in place of the single resistor R shown in FIGURE 1, the circuitry shown in FIGURE 1A can be connected between the terminals 11 and 12 shown in FIGURE 1 in which the single resistor R is represented by four resistors $R_a$, $R_b$, $R_c$ and $R_d$. Similarly, the single Zener diode Z shown in FIGURE 1 can be replaced by a plurality of Zener diodes such as $Z_a$, $Z_b$ and $Z_c$ as shown in FIGURE 1B in which the plurality of Zeners would be connected between the terminals 12 and 13 and would take the place of the single Zener diode Z. Normally closed switches S1, S2 and S3 are shown associated with the resistors $R_a$, $R_b$ and $R_c$ and normally open switches S4, S5 and S6 are associated with the Zener diodes $Z_a$, $Z_b$ and $Z_c$. These switches are provided for inserting certain of the resistors and simultaneously removing certain of the Zener diodes. These switches can be in the form of a multi-position rotary switch. The simultaneous switching ensures that the proper average Zener current flows for all possible combinations. These three switches will give seven possible combinations as given by $2^3-1$. This multiplied by the five possible voltages represented by the voltages V1, V2, V3, V4 and V5 make it possible to obtain 35 high voltage values from the circuitry which is shown in FIGURES 1, 1A and 1B. Although the circuitry is relatively simple it is possible to obtain these 35 output voltages which are relatively high voltage and which are regulated and filtered.

By way of example, one power supply incorporating my invention used the following components.

Transformer T1 _____ 110-250 volts.
Zener diodes Z consisting
 of 2 serially connected
 diodes _____ Type No. 1N745.
Resistor R _____ 18000 ohms.
Capicitors C1, C2, C3,
 C4 and C5 _____ 8 microfarads, 450 volts.
Diodes D1, D2, D3 and D4 __ Type No. 1N2071.

With this arrangement, it was possible to obtain a regulated D.C. output voltage of over 1000 volts with one percent regulation.

From the foregoing, it can be seen that I have provided a new and improved high voltage circuit in which it is possible to utilize a very inexpensive transformer and in which one or more Zener diodes are utilized for rectification and voltage limiting to provide a voltage which can be readily multiplied to the desired voltage level. This eliminates the necessity for the plurality of Zener diodes in the output of the multiplication circuitry. This also reduces the requirement from the power supply because the Zener diode in my circuitry is placed in a part of the circuit where there is no continuous D.C. current.

I claim:

1. In a high voltage power supply, a source of low voltage alternating current electrical power having a predetermined source impedance and having first and second output terminals, semi-conductor means having the characteristics of a Zener diode and having first and second terminals, means interconnecting the first terminal of the source and the first terminal of the semiconductor means, capacitor means having first and second terminals, means interconnecting the first terminal of the capacitor means and the second terminal of the source, means including a junction interconnecting the second terminal of the capacitor means and the second terminal of the semi-conductor means and voltage multiplying means consisting of at least one serially connected diode and capacitor pair, and means connecting the first of said pairs to the first and second terminals of the semiconductor means and means connecting each succeeding pair across the diode of the preceding pair, said power supply serving to supply high voltage power substantially regulated against source of voltage variations.

2. A high voltage power supply as in claim 1 wherein said semiconductor means is comprised of a plurality of serially connected Zener diodes.

3. A high voltage power supply as in claim 1 together with means for shorting out a predetermined number of the Zener diodes and means for simultaneously adjusting the source impedance as the Zener diodes are shorted out.

References Cited by the Examiner
UNITED STATES PATENTS

| | | | |
|---|---|---|---|
| 2,819,442 | 1/1958 | Goodrich. | |
| 2,856,575 | 10/1958 | Charbonnier | 321—15 |
| 3,048,766 | 8/1962 | Panger | 321—15 |
| 3,209,236 | 9/1965 | Bridgeman. | |

FOREIGN PATENTS

| | | |
|---|---|---|
| 1,306,211 | 9/1962 | France. |

JOHN F. COUCH, *Primary Examiner.*
M. L. WACHTELL, *Assistant Examiner.*